United States Patent

Tagliaferri

[11] Patent Number: 5,159,869
[45] Date of Patent: Nov. 3, 1992

[54] CUTTING STATION FOR A PANEL CUTTING MACHINE

[75] Inventor: Renzo Tagliaferri, Piacenza, Italy
[73] Assignee: Selco S.r.l., Crespellano, Italy
[21] Appl. No.: 599,053
[22] Filed: Oct. 17, 1990

[30] Foreign Application Priority Data

Oct. 18, 1989 [IT] Italy .................. 4926/89[U]

[51] Int. Cl.$^5$ .............................................. B27B 5/20
[52] U.S. Cl. ...................... 83/862; 83/471.2; 83/477.1; 83/477.2; 83/488; 83/491; 83/877; 144/3 R; 144/368
[58] Field of Search ................. 83/863, 864, 876, 877, 83/471.2, 477.1, 477.2, 491, 485, 486, 488, 862; 144/3 R, 368

[56] References Cited

U.S. PATENT DOCUMENTS

| | | | |
|---|---|---|---|
| 4,334,450 | 6/1982 | Benuzzi | 83/471.2 |
| 4,534,256 | 8/1985 | Benuzzi | 83/863 |
| 4,607,555 | 8/1986 | Erhard | 83/477.2 X |
| 4,771,667 | 9/1988 | Forman et al. | 83/477.2 X |
| 4,829,868 | 5/1989 | Jenkner | 83/863 |

FOREIGN PATENT DOCUMENTS

1232800 5/1971 United Kingdom ............... 83/163

Primary Examiner—Frank T. Yost
Assistant Examiner—Raymond D. Woods
Attorney, Agent, or Firm—Palmatier & Sjoquist

[57] ABSTRACT

A cutting station comprising a bed; a work surface supported on the bed; a carriage traveling along the longitudinal axis of the bed by virtue of a first motor; two cutting members connected to two second motors; and a structure supporting the cutting members and second motors, and designed to travel, by virtue of actuators, along vertical slideways supported on the carriage, and to be carried by the carriage during traversing of the same. The bed comprises two fixed parallel beams supporting the work surface, and a first of which also supports two horizontal slideways for supporting and guiding the carriage. The center of gravity of the second motors lies within the space defined between the horizontal slideways.

4 Claims, 2 Drawing Sheets

CUTTING STATION FOR A PANEL CUTTING MACHINE

BACKGROUND OF THE INVENTION

The present invention relates to a cutting station, in particular, to a perfected bed thereof, for a panel cutting machine, particularly for cutting wood panels. At present, the beds of known panel cutting machines comprise two parallel beams supporting the work surface. On a first type of bed, the beams act as a slideway for a carriage supporting the precutting and cutting blades and the blade drive motors, while a second type differs from the first solely in that the carriage runs along only one of the beams.

Both types present numerous drawbacks.

In the case of the first, the length of the beams (about seven meters) makes it difficult for them to be maintained parallel. Moreover, the considerable weight of the motors, which are installed in-line with one of the beams, produces a twisting moment, especially on the beams, thus resulting in wear of the slideway system. What is more, said twisting moment is also reflected and even amplified on the cutting blade, in view of the distance between the blade and the slideway system.

On the second type of bed, whereas the distance between the slideway system and the cutting axis is advantageously reduced, the twisting moment is increased as a result of the design and differing function of the two beams.

SUMMARY OF THE INVENTION

The aim of the present invention is to provide a cutting station featuring a perfected bed designed to overcome the above drawbacks, i.e. which provides for maintaining the beams parallel and minimizing the twisting moment produced by the weight of the motors.

With this aim in view, according to the present invention, there is provided a cutting station for a panel cutting machine, comprising a bed; a work surface supported on said bed; a carriage traveling along the longitudinal axis of said bed by virtue of first drive means; at least one cutting member connected to second drive means; and a structure supporting said cutting member and said second drive means, and designed to travel, by virtue of third drive means, along vertical slideways supported on said carriage, and to be carried by said carriage during traversing of the same; characterized by the fact that said bed comprises two fixed parallel beams supporting said work surface, a first of which beams also supports two horizontal slideways for supporting and guiding said carriage; and by the fact that the center of gravity of said second drive means lies within the space defined between said horizontal slideways.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
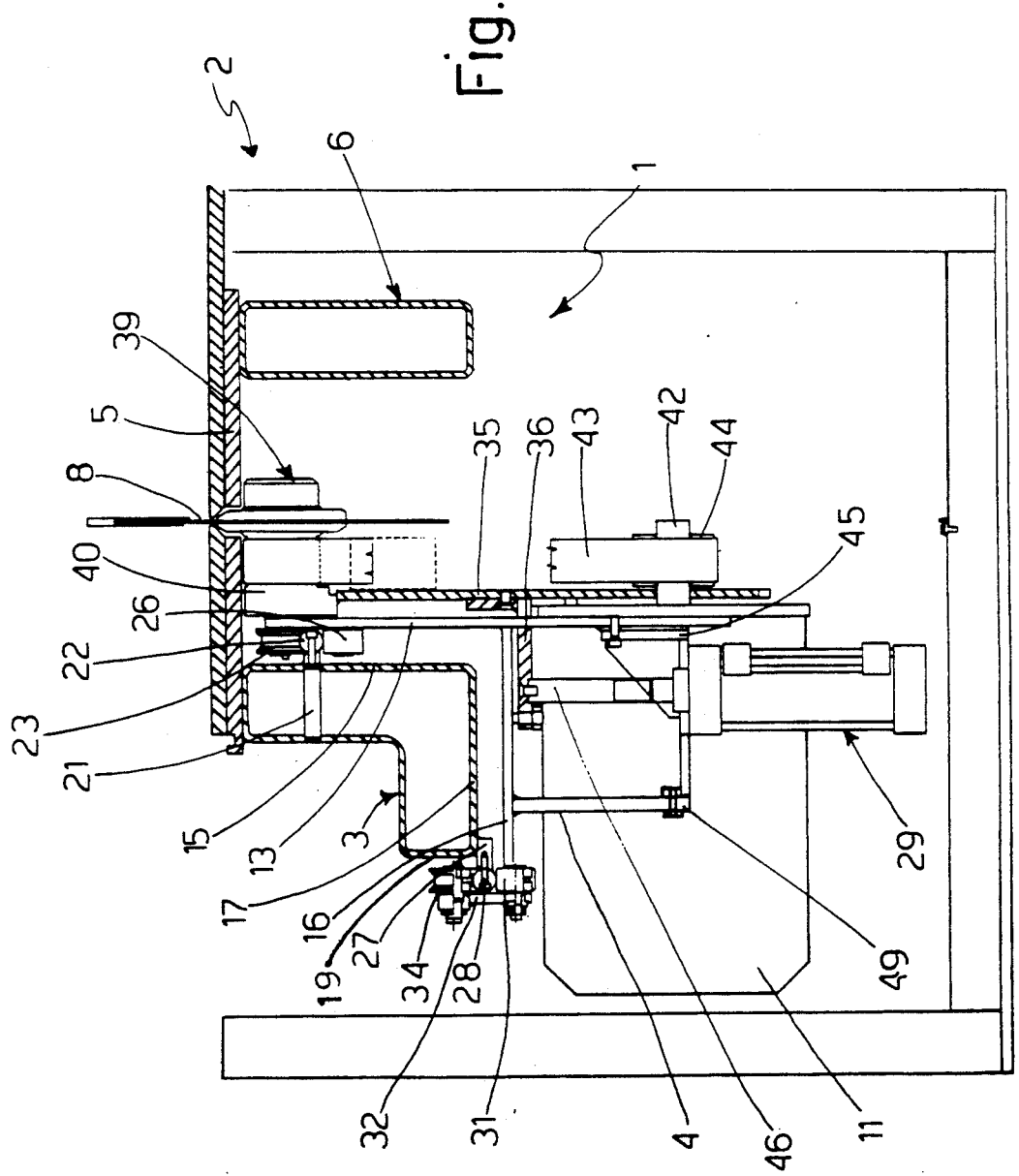
FIG. 1 shows a partially-sectioned side view of a cutting station in accordance with the present invention.

Number 1 in the accompanying drawings indicates a bed for the cutting station 2 of a woodworking machine, in particular, for cutting wood panels.

Bed 1 comprises two fixed parallel beams 3 and 6, of which beam 3 acts as a slideway for a carriage 4 and supports a work surface 5, while beam 6 provides solely for supporting work surface 5. Beams 3 and 6 are in turn supported at the ends on respective feet 9, and consist of hollow metal sections having a back-to-front L-shaped and rectangular cross section respectively. In particular, the L-shaped section of beam 3 comprises a first rectangular section similar to, of the same size as, and located on a level with that of beam 6; and a second rectangular section extending perpendicularly outwards of bed 1 from the bottom portion of said first section. The cutting axis of a precutting (or notching) blade 7 and a cutting blade 8 is defined along the center line of, and parallel to, beam 6 and said first section of beam 3.

Carriage 4 travels parallel to said cutting axis, and supports blades 7 and 8 and two electric motors 11 and 12 by which blades 7 and 8 are driven. Carriage 4 comprises a plate 13 lying in a vertical plane parallel to the longitudinal axes of beams 3 and 6, and parallel to vertical wall 15 of said first section of beam 3. From an intermediate portion of plate 13, there extends perpendicularly outwards a horizontal wall 16 parallel to horizontal wall 17 of said second section of beam 3. It will be noted that plate 13 is located closer to the cutting axis than wall 15, while wall 16 is located below wall 17.

The first section of beam 3 is fitted integral with horizontal pins 21, the ends of which, outside beam 3, are fitted with a fixed cylindrical bar 22 on which rest two wheels 23 having a horizontal rotation axis perpendicular to the longitudinal axis of beam 3. Wheels 23 are fitted on a respective pin integral with carriage 4, in particular, with the upper portion of plate 13, which also supports a further two pins fitted with a respective roller 26 contacting the bottom face of bar 22. On the end facing outwards of bed 1, wall 17 is fitted, e.g. welded, with horizontal pins 27 fitted on the ends with a fixed cylindrical bar 28 similar to bar 22. The end of wall 16 facing outwards of bed 1 is fitted with two pins, each of which is fitted with a roller 31 (with a horizontal rotation axis) similar to roller 26 and contacting the bottom face of bar 28. The above end of wall 16 supports brackets 32 extending upwards and fitted with a respective horizontal pin in turn fitted with a wheel 34 having a horizontal rotation axis perpendicular to the longitudinal axis of beam 3, and resting on the top face of bar 28. The lateral surface of wheels 23 and 34 presents an annular groove by which to run along respective bars 22 and 28. It will be noted that bars 22 and 28, along which carriage 4 travels, are located outwards of both sections of beam 3. In particular, bar 22 is located between wall 15 and plate 13, while the longitudinal axis of bar 28 lies in a plane parallel to, but outwards of, a second vertical wall 19 of beam 3.

Carriage 4 also comprises a second plate 35 extending in a vertical plane (closer to the cutting axis than plate 13) and designed to travel together with plate 13 along a longitudinal axis parallel to those of beams 3 and 6, and along a vertical plane by virtue of a hydraulic actuator 29. By means of a bracket 36, plate 35 supports, e.g. is screwed to, the casing of motor 11 which, as shown in the accompanying drawings, is housed almost entirely within the space defined between the two vertical planes containing the slideways of carriage 4. In fact, the center of gravity of motor 11 may definitely be said to lie within said two planes.

On top, plate 35 supports a known cutting member 39 comprising blade 8 and a pulley 40 for driving blade 8 and which is in turn driven by the output shaft 42 of motor 11 via a belt 43 driven by a second pulley 44 on shaft 42. By means of a bracket 45 underneath, plate 13 supports the casing of actuator 29, the piston 46 of which is connected integral with plate 35 by means of a bracket 36. A second bracket 49 connects the casing of actuator 29 mechanically to wall 16. Similarly, carriage 4 comprises a further plate 41 similar to plate 35 and supporting on top a second cutting member 47 comprising blade 7 and a pulley 48 driven via belt 51 by a pulley 52 on output shaft 53 of motor 12. The casing of motor 12 is supported on plate 41 by means of a bracket 54. By means of a respective bracket 55, plate 13 and wall 16 support the casing of a second hydraulic actuator 56, the piston of which is connected integral with plate 41 by means of a bracket similar to bracket 54. As such, plate 41 also travels along an axis parallel to beams 3 and 6 by the carriage 4 and along a vertical axis by hydraulic actuator 56, and motor 12 also presents its center of gravity between the slideways of carriage 4.

Figure 2:
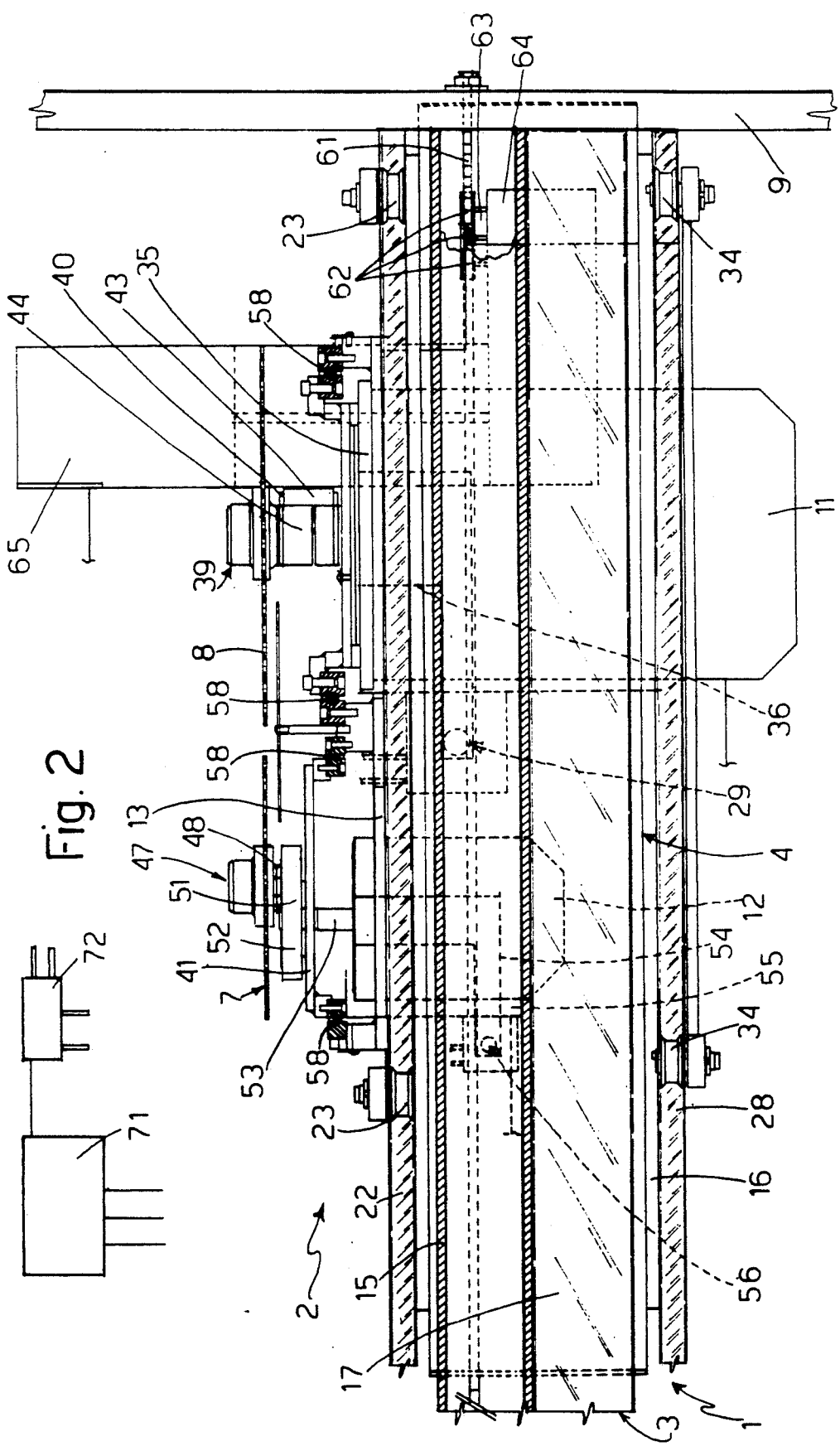
FIG. 2 shows a larger-scale, partial plan view of the FIG. 1 cutting station.

Plate 13 travels solely along an axis parallel to the longitudinal axes of beams 3 and 6, which displacement also entrains plates 35 and 41 and, consequently, motors 12 and 11 and actuators 29 and 56. On the other hand, plates 35 and 41 and, consequently, motors 12 and 11 may also travel along a vertical axis by virtue of actuators 29 and 56. The vertical slideway system of plates 35 and 41 is of known type and, in particular, consists, for each plate 35 and 41, of two vertical bars 58 supported on plate 13 and connected to vertical tracks defined on the lateral ends of plates 35 and 41, as shown in FIG. 2. Carriage 4 and, consequently, plate 13 are driven by a known system comprising a chain 61 extending along an axis parallel to that of beam 3. Chain 61 is secured at the ends to respective fixed bodies, and presents a portion meshing successively with three gears 62, two of which are mounted in idle manner on respective horizontal pins on plate 13, while the enter one is fitted onto the output shaft 63 of a reduction member 64, the input shaft of which is driven by the output shaft of a third electric motor 65. Motor 65 and reduction member 64 are supported in known manner (not shown) on carriage 4 so as to accompany displacement of the same.

Cutting station 2 also comprises an electronic control system 71 for controlling motors 11, 12 and 65 and a hydraulic system 72 (shown schematically in FIG. 2) in turn controlling actuators 29 and 56.

In actual use, carriage 4 assumes a first limit position wherein, by virtue of actuators 56 and 29, the cutting edges of blades 7 and 8 are located beneath work surface 5. Via system 72 controlling actuators 56 and 29, electronic control system 71 raises plates 41 and 35 together with blades 7 and 8, then activates motor 65 for moving carriage 4 into a second limit position, while at the same time activating motors 11 and 12 for operating respective blades 7 and 8, which provide respectively for notching and actually cutting the panel. Upon carriage 4 moving into said second limit position, control system 71 first lowers blades 7 and 8 and then restores carriage 4 to said first limit position.

The advantages of the present invention will be clear from the foregoing description.

In particular, the center of gravity of the assembly consisting of carriage 4, motors 11 and 12, actuators 29 and 56 and reduction member 64 may be said to lie within the space defined between the two slideway axes of carriage 4. Which characteristic may be assumed to be proved by the fact that actuators 29 and 56, reduction member 64 and large part of motors 11 and 12 are located within the two slideway axes of carriage 4, and by the fact that the weight of the electric motors is generally distributed evenly over the longitudinal axis of the same. Said location of the center of gravity, plus the fact that wheels 23 and 34 of the slideway system of carriage 4 turn about respective horizontal axes, mean beam 3 is subjected to a very small twisting moment which in no way affects the panel cutting line. Moreover, any wear is distributed almost evenly over the two slideways, thus reducing the maintenance cost of the machine as a whole. Finally, the straightforward design of cutting station 2 and bed 1 provides for troublefree, low-cost manufacture.

To those skilled in the art it will be clear that changes may be made to station 2 as described and illustrated herein without, however, departing from the scope of the present invention.

For example, the first and second sections of beam 3 may be formed in two pieces and welded together to give an overall section of any shape other than that described and illustrated herein.

I claim:

1. A cutting station for a panel cutting machine, comprising:
    a) a bed comprising:
        1) a first horizontal fixed beam;
        2) a second horizontal fixed beam running parallel to the first horizontal fixed beam; and
        3) a work surface supported by the beams;
    b) a pair of horizontal slideways fixed to the first horizontal fixed beam, the horizontal slideways running parallel to each other and to the first horizontal fixed beam, each of the horizontal slideways defining a vertical plane and a space between the planes;
    c) a carriage depending from and being supported and guided by the horizontal slideways and comprising:
        1) a first cutting member;
        2) first cutting member operating means for operating the first cutting member and having a center of gravity;
        3) a first generally vertical slideway;
        4) first cutting member vertical drive means for driving the first cutting member and its respective operating means along the first vertical slideway, the first cutting member vertical drive means having a center of gravity lying in the space between the vertical planes defined by the horizontal slideways;
        5) a second cutting member;
        6) second cutting member operating means for operating the second cutting member and having a center of gravity;
        7) a second generally vertical slideway independent of the first vertical slideway; and
        8) second cutting member vertical drive means for driving the second cutting member and its respective operating means along the second vertical slideway, the second cutting member vertical drive means having a center of gravity lying in the space between the vertical planes defined by the horizontal slideways;

d) carriage drive means mountable on the carriage for driving the carriage along the horizontal slideways; and e) the center of gravity of the first and second cutting member operating means lying in the space between the vertical planes defined by the horizontal slideways to maximize the stability of the carriage.

2. The cutting station of claim 1, wherein the carriage comprises at least four wheels turning about horizontal axes perpendicular to the first horizontal fixed beam, two of the wheels engaging one of the horizontal slideways, the other two wheels engaging the other of the horizontal slideways.

3. The cutting station of claim 1 and the first horizontal fixed beam including opposing sides, wherein each of the horizontal slideways are fixed to one of the opposing sides, one of the horizontal slideways disposed higher than the other of the horizontal slideways, the higher of the horizontal slideways being disposed between the first horizontal fixed beam and the first cutting member.

4. The cutting station of claim 3, wherein the first horizontal fixed beam comprises an L-shape cross-section.

* * * * *

UNITED STATES PATENT AND TRADEMARK OFFICE
CERTIFICATE OF CORRECTION

PATENT NO. : 5,159,869

DATED : November 3, 1992

INVENTOR(S) : Renzo Tagliaferri

It is certified that error appears in the above-identified patent and that said Letters Patent is hereby corrected as shown below:

Column 3, line 46, delete "enter" and insert therefor --center--.

Signed and Sealed this

Twenty-third Day of November, 1993

Attest:

BRUCE LEHMAN

Attesting Officer

Commissioner of Patents and Trademarks